U. FORSBERG.
COMBINED RADIAL AND DOUBLE THRUST BALL BEARING.
APPLICATION FILED AUG. 10, 1917.
1,259,222.
Patented Mar. 12, 1918.
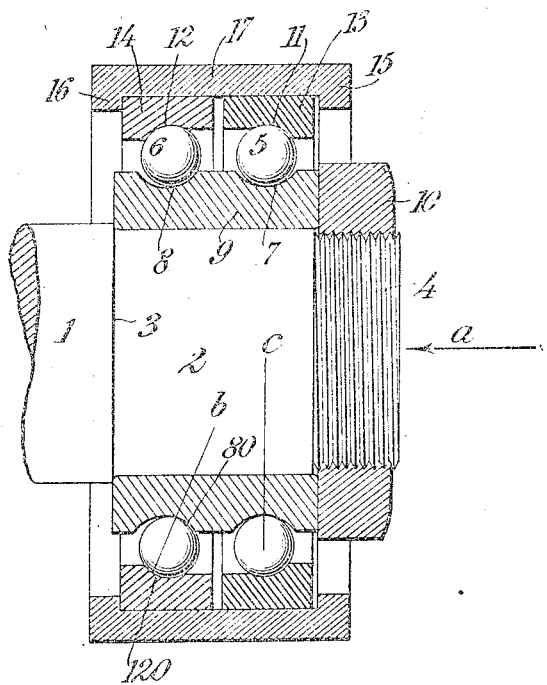

UNITED STATES PATENT OFFICE.

UNO FORSBERG, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

COMBINED RADIAL AND DOUBLE THRUST BALL-BEARING.

1,259,222.  Specification of Letters Patent.  Patented Mar. 12, 1918.

Application filed August 10, 1917.  Serial No. 185,463.

*To all whom it may concern:*

Be it known that I, UNO FORSBERG, a subject of the King of Sweden, residing in Gottenborg, Sweden, have invented certain new and useful Improvements in Combined Radial and Double Thrust Ball-Bearings, of which the following is a specification.

This invention relates to ball bearings and has for an object to provide a bearing which supports radial load and also effectively sustains end thrusts in both directions, there preferably being two rows or sets of balls, one of which is adapted to receive the end thrust in one direction and the other of which is adapted to receive the end thrust in the opposite direction. When one set of balls receives the end thrust, the other set of balls is free to support the radial load in a normal manner.

In the drawing accompanying this specification, a practicable embodiment of the invention is illustrated in axial section. This drawing shows an illustrative example of the invention and it is to be understood that changes are to be made within the scope of the claims as occasion demands, without departing from the spirit of the invention.

The ball bearing in the present illustration is shown in connection with a shaft 1, said shaft having a reduced portion 2 affording a shoulder 3 toward the body of the shaft and a screwthreaded end 4. Two coaxial sets of balls 5 and 6 are shown disposed in parallel planes and surrounding the end of the shaft. The inner track faces 7 and 8 for these ball sets are shown rigidly connected. In the present illustration they are formed upon a single ring 9 having a tight fit upon the reduced portion 2 of the shaft and pressed against the shoulder 3 by means of a nut 10 mounted upon the screwthread 4. This ring 9 is thus fast with the shaft to rotate and move axially therewith, together with the pair of inner track faces 7 and 8. The other pair of track faces 11 and 12, namely, the outer track faces, in the present illustration are capable of movement in an axial direction one relatively to the other. The track faces 11 and 12 are shown formed on separate and disconnected rings 13 and 14 respectively. The amplitude of the relative movement of the rings 13 and 14 and consequently the pair of track faces 11 and 12 is limited by means of a pair of abutments 15 and 16, said abutments in the present illustration being in the form of flanges provided upon an outer casing 17. The abutment in one sense may be said to limit the amplitude of the movement of the rings; in another sense, the abutments are intended to act as transmission members for transmitting axial thrust from the casing 17 to the shaft 1.

In describing the operation of the invention by means of the present illustration, it is assumed that the outer ring 17 is fixed and that the shaft 1 is rotatable and capable of thrusting in either longitudinal direction and receiving its support from the fixed ring 17. Assuming that the thrust of the shaft 1 is in the direction of the arrow $a$, the balls 6 receive pressure in the direction of the line $b$, namely, between the side 80 of the race 8 and the side 120 of the race 12, which has a tendency to move the ring 14 against the abutment 16 and thereby limit or prevent the thrusting tendency of the shaft. During the thrusting the balls 5 move their ring 13 in the direction of the thrust, but, nevertheless, without constraint being applied to such ring, whereby the radial load of the shaft is freely and normally supported by these balls (see the line $c$).

Upon the change of direction of axial thrust, it becomes apparent that the ball set 5, which was theretofore sustaining the radial load, is caused to assume the axial thrust and the ball set 6 which was supporting the axial thrust is relieved of such thrust and caused to assume the radial load.

It also will be observed that neither ball set is exposed to axial thrust in both directions.

What I claim as my invention is:—

1. A combined radial and double thrust ball bearing, comprising two coaxial sets of balls disposed in parallel planes, a pair of inner track faces and a pair of outer track faces for the balls, one pair of said faces being rigidly connected, and the other pair of the said faces being capable of movement in an axial direction one relatively to the other, and means for limiting the amplitude of such movement.

2. A combined radial and double thrust ball bearing, comprising two coaxial sets of balls disposed in parallel planes, a pair of inner track faces and a pair of outer track faces for the balls, one pair of said faces being rigidly connected, and the other pair of the said faces being capable of movement in an axial direction one relatively to the other, and means for maintaining the said relatively movable faces in coaxial relation.

3. A combined radial and double thrust ball bearing, comprising two coaxial sets of balls disposed in parallel planes, a pair of inner track faces and a pair of outer track faces for the balls, one pair of said faces being rigidly connected, and the other pair of the said faces being capable of movement in an axial direction one relatively to the other, means for limiting the amplitude of such movement, and means for maintaining the said relatively movable faces in coaxial relation.

4. A combined radial and double thrust ball bearing, comprising two coaxial sets of balls disposed in parallel planes, a pair of separated rings for one side of the balls, a mounting for said rings permitting a limited predetermined relative axial movement of said rings, and a single ring for the other side of the said balls.

5. A combined radial and double thrust ball bearing, comprising two coaxial sets of balls disposed in parallel planes, a pair of separated rings for one side of the balls, a mounting for said rings for maintaining the same in coaxial relation and permitting axial movement thereof, said mounting having abutments for engaging the respective rings upon the thrusting of one of such rings, and a single ring for the other side of the said balls.

In witness whereof, I have hereunto signed my name.

UNO FORSBERG.